Aug. 18, 1936.    H. FORD    2,051,474
MOTOR VEHICLE BRAKE
Filed March 19, 1934    3 Sheets-Sheet 1
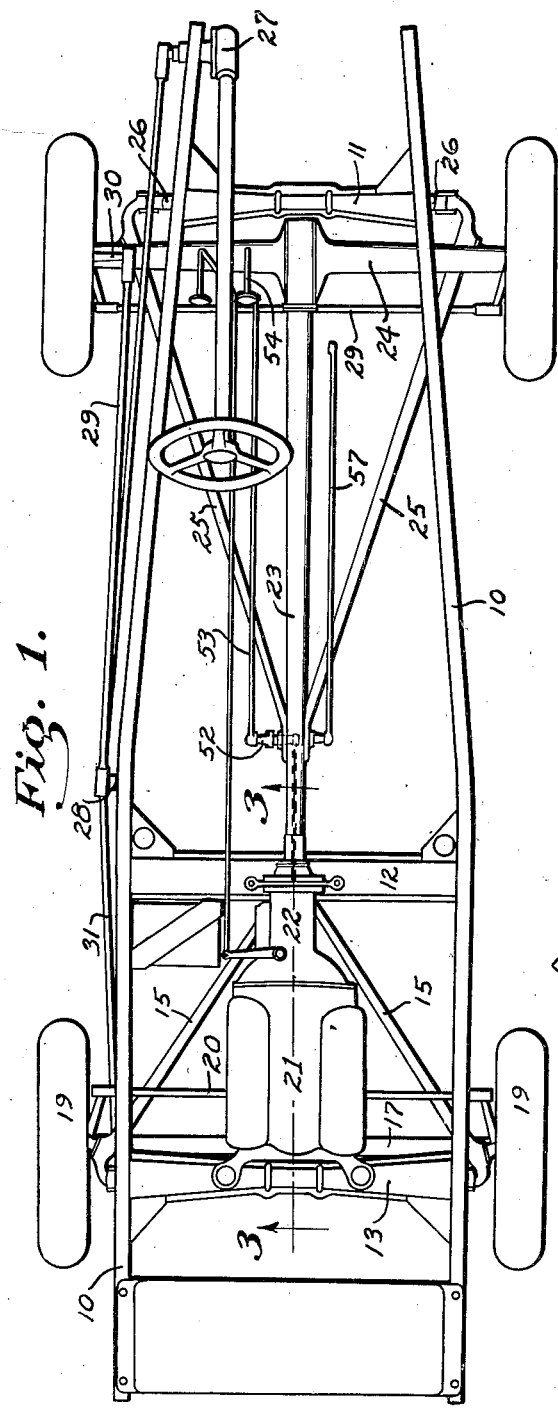
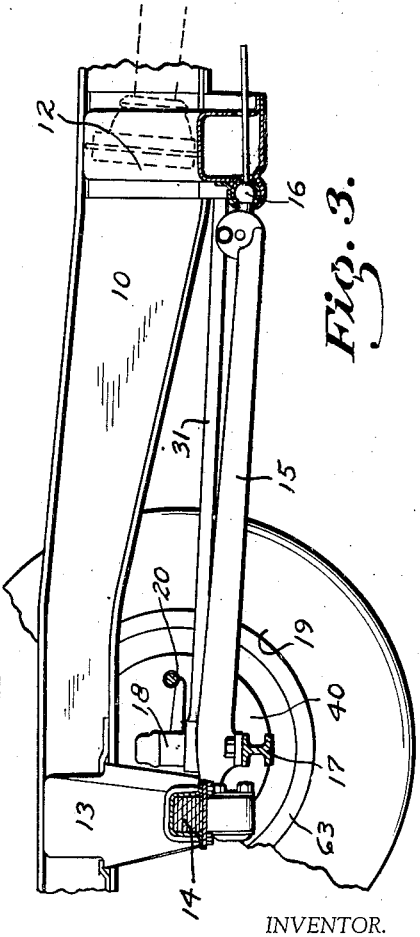
INVENTOR.
Henry Ford.
BY
ATTORNEY.

Aug. 18, 1936.   H. FORD   2,051,474
MOTOR VEHICLE BRAKE
Filed March 19, 1934   3 Sheets-Sheet 2
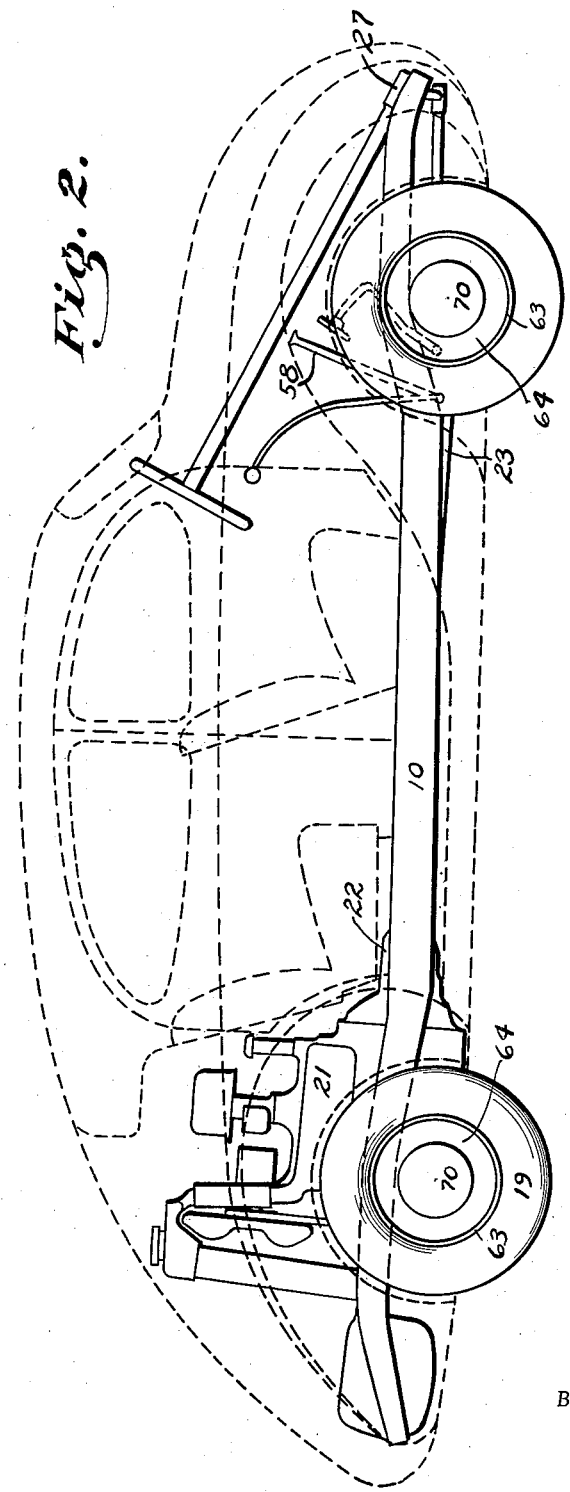
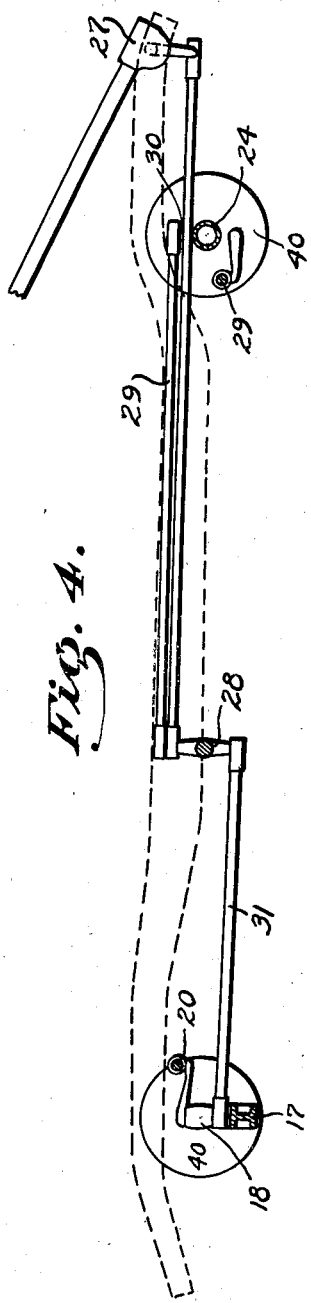
INVENTOR.
Henry Ford.
BY
ATTORNEY.

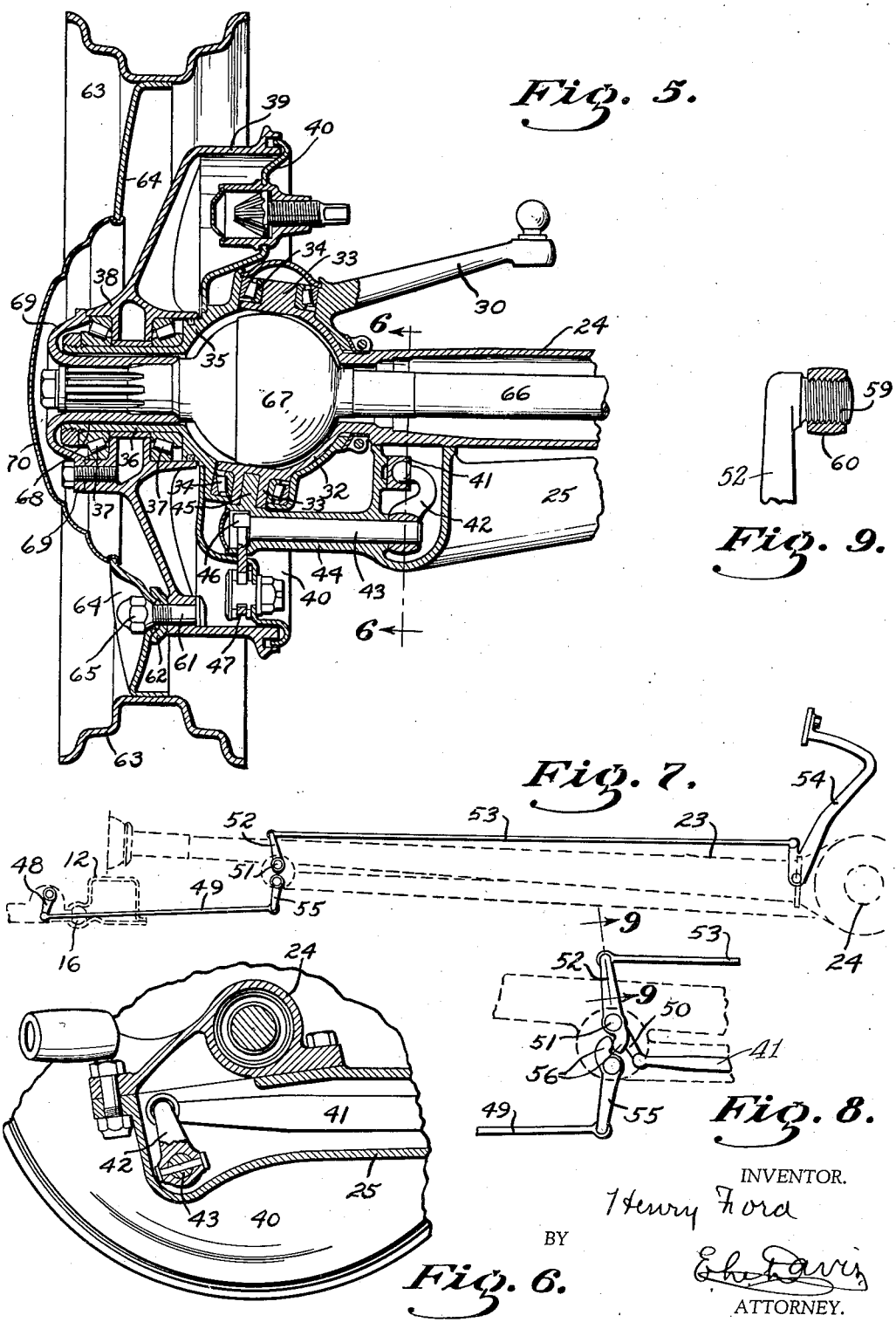

Patented Aug. 18, 1936

2,051,474

UNITED STATES PATENT OFFICE 2,051,474

MOTOR VEHICLE BRAKE

Henry Ford, Dearborn, Mich., assignor to Ford Motor Company, Dearborn, Mich., a corporation of Delaware Application March 19, 1934, Serial No. 716,238

1 Claim. (Cl. 188—194)

The object of my invention is to provide a motor vehicle wherein the arrangement of chassis elements is especially adapted for use in connection with a vehicle body of streamlined shape. The body per se forms no part of my invention, the novel design and arrangement of the elements which make the use of such body more practical constituting my invention.

What is believed to be a novel characteristic of my vehicle construction is that the motor is disposed directly over the rear axle, there being a drive shaft and torque tube extending therefrom forwardly to the front axle which is driven by the motor. Several advantages arise from this construction, the first being that the seating arrangement of the vehicle may be materially improved, it being possible to place the seats well forwardly of the positions occupied by the seats in the conventional car so that the passengers are disposed substantially at a point intermediate of the front and rear axles. The vertical movement or bouncing of the passengers due to road irregularities on the wheels is materially lessened for this reason.

Further, this construction incorporates all of the inherent advantages of vehicles having the torque tube type of drive. Still further, the applicant's construction differs from the many designs of rear-engined cars in that his engine is placed directly over the rear axle, whereas in all of such vehicles with which applicant is familiar the engine is placed either forwardly or rearwardly of the rear axle. It will be apparent that when the engine is placed forwardly of the rear axle an excessive wheel base length is required to provide for a given passenger compartment area while, when the engine is placed rearwardly of the rear axle then an excessive length of the vehicle is required or else the rear wheels must be placed directly under the rear seat of the car. It is believed that only when the engine is placed directly above the rear axle that the most desirable seating arrangement, wheel base, and length of body can be obtained.

It has been proposed in the past to place an engine directly above the rear axle of a vehicle and to transmit the engine torque through a return gear box, disposed forwardly of the engine, rearwardly beneath the engine to the rear axle. Aside from the disadvantage in cost and inefficiency of the return gear box, such device has a further disadvantage in that the clearance required for the driving axle on such a unit necessitates placing the motor a considerable distance higher in the frame than is required where a "dead" axle is employed. Such a dead axle may be bowed downwardly at its center, of course, to clear the motor when same is placed in a very low position. Consequently, with the arrangement shown a very low center of gravity is obtained together with an ideal seating arrangement, car length and weight distribution.

A further object of my invention is to provide a front wheel drive vehicle wherein both the front and rear wheels are simultaneously pivoted to steer the car. The vehicle is believed unique in that about sixty per cent of the steering is accomplished by the front wheels with only forty per cent resulting from the rear wheels. This construction permits a short turning radius with a permissible angular movement of the front driving wheel universal joints while at the same time the rear end of the car, being moved laterally to a lesser degree than the front wheels, is prevented from swinging in towards the object away from which the front end of the car is being steered. This arrangement eliminates a major inherent defect in all other four-wheel steered vehicles of which the applicant is familiar.

Still a further object of my invention is to provide an improved brake hook-up whereby the brakes on all four wheels are simultaneously operated.

With these and other objects in view, my invention consists in the arrangement, construction and combination of the various parts of my improved device, as described in the specification, claimed in my claims and illustrated in the accompanying drawings, in which:

Figure 1 shows a plan view of my improved chassis construction.

Figure 2 shows a side view of the chassis, shown in Figure 1, a streamlined vehicle body being shown in position thereon by dotted lines.

Figure 3 is a central vertical sectional view, taken on the line 3—3 of Figure 1.

Figure 4 is a side view of the steering mechanism employed, the vehicle frame being shown by dotted lines to better illustrate the construction.

Figure 5 is a vertical central sectional view through the right front vehicle wheel, illustrating both the driving means and brake applying mechanism.

Figure 6 is a sectional view, taken on the line 6—6 of Figure 5.

Figure 7 is a diagrammatic view illustrating the brake hook-up employed in my vehicle.

Figure 8 is a view of the brake applying mechanism, particularly the operative connection between the front and rear wheel brakes, and Figure 9 is a sectional view, taken on the line 9—9 of Figure 8.

Referring to the accompanying drawings, I have used the reference numeral 10 to indicate generally a vehicle frame having front, center and rear cross members 11, 12 and 13, respectively. A rear transverse type spring 14 is secured in the conventional manner to the intermediate portion of the rear cross member 13, while the outer ends of this spring are shackled to the rear ends of a pair of radius rods 15. The forward ends of these radius rods are secured to each other and are universally connected by means of a ball joint 16 with the center cross member 12. A rear axle 17, of I-beam section, extends transversely beneath the rear portions of the radius rods 15, being secured to each radius rod. It will be noted that this axle is disposed somewhat forwardly from the spring 14 and that each end of the axle 17 is provided with a knuckle joint 18 upon which joints rear wheels 19 are rotatably mounted. These rear wheels are provided with suitable steering arms and a tie rod 20 is provided which connects the two wheels for steering. The specific construction employed herein is not illustrated in detail as any one of the many constructions heretofore used on the front axle of the conventional vehicle is suitable for use herein.

It will be noted that I have provided a V-type motor 21 and transmission 22, the rear end of which is mounted upon the cross member 13 while the forward end of the motor is resiliently mounted upon the center cross member 12. A torque tube 23 is universally secured to the forward end of the transmission unit 22 and extends forwardly to a front driving axle 24, this axle being of tubular construction with an enlarged center portion in which is mounted a ring gear and differential unit. A pair of diagonally extending radius rods 25 extend from near the rearward end of the torque tube 23 laterally and forwardly beyond the outer ends of the axle 24, these radius rods being secured to the adjacent portions of the axle. The radius rods project about 6 or 8 inches in front of the axle unit 24. A front transverse spring 26 is provided with its center portion secured to the frame member 11, the outer ends of the spring being shackled to the forward ends of the radius rods 25. Thus, the center cross member of the frame absorbs the braking and driving stresses on the wheels by means of the radius rods 15 and 25 in substantially the same manner as is accomplished in the conventional transverse spring equipped vehicle.

Referring to Figures 1 and 2, it will be noted that I have provided a steering gear assembly 27 which is secured to the forward left-hand corner of the frame member 10. I have also provided a beam 28 which is pivotally mounted on the left-hand frame side member intermediate of the frame ends. It will be noted from Figure 4 that the upper and lower arms of the beam 28 are not of equal length and that the upper or longer end of the lever is pivotally connected to a front drag link 29, which drag link extends forwardly where it is pivotally connected to a steering arm 30 of the front driving wheels. The lower or shorter arm of the beam 28 is pivotally connected to a rear drag link 31 which extends rearwardly to the steering arm associated with the rear wheels of the vehicle. Because the two arms of the beam 28 are of unequal length a given angular movement of this lever causes about 50 per cent greater angular movement of the front wheels than of the rear wheels. An advantage results from this structure in that the angular movement required of the front wheels for steering is reduced from about 40 degrees down to about 25 degrees so that I am able to use universal joints at the wheels having a working range of about 25 degrees. If a 40-degree movement were required an entirely different type of joint would need be provided, which could be done only at a much greater cost.

The maximum turning movement of the rear wheels is only about 15 degrees which occurs when the front wheels are turned through 25 degrees. The front wheels are of course swung oppositely from the rear wheels, but due to the extra front wheel movement, the rear wheels do not swing the rear end of the car in a direction opposite to the lateral movement of the front end. In the conventional car wherein only the front wheels are steered, the car upon being turned pivots around the rear wheels so that the path of the rear wheels over one length of the car curves in the same direction as the front wheels are turned. In contrast to this cars in which all four wheels are steered equally follow a different path. In such cars the vehicle upon being turned pivots around the center point of the car so that the path of the rear wheels over one car length curves towards the side opposite from that to which the front end is moving. This is a dangerous characteristic as it in effect causes the rear end of the car to move closer to an object from which the front end is being steered. In the applicant's arrangement the rear wheels follow a path which, although not diverging towards the direction in which the front wheels are turned, still does not swing toward the opposite side. Thus, safe steering with a minimum turning radius and minimum universal joint movement is provided.

Referring to Figure 5, which illustrates one of the front driving wheels of the vehicle, it will be noted that the outer ends of the axle 24 are each flared out to form halves of spherical joint housings. A pair of pins 33 are formed integrally with each sphere, the pins being vertically aligned on an axis very similar to the axis of the king pin in the conventional car. A pair of tapered roller bearings 34 are secured on each of these pins, while a spherical member 35 is secured to the periphery of these bearings so as to pivot around the axis of the pins 33. The steering arm 30 is formed integrally with the member 35 so that oscillation of this arm swings the member 35 around the axis of the pins 33. A spindle 36 is formed integrally with the member 35 and extends outwardly therefrom, the spindle having a pair of spaced tapered roller bearings 37 mounted thereon. A brake drum hub 38 is rotatably mounted by means of the bearings 37, this hub being formed integrally with a brake drum 39 which partially encloses the member 35. A brake anchor plate 40 is fixedly secured to the member 35 and extends outwardly to the periphery of the brake drum so as to form a substantial dust-tight shield with the periphery of the brake drum 39. Suitable brake shoes, not shown in the drawings, are secured to the anchor plate in the conventional manner and act upon the interior of the drum 39.

The mechanism which is provided for operating the brakes is housed for the most part within the radius rods 15 and 25, this general scheme and the general arrangement of the brake shoes and associated mechanism being disclosed in my United States Patent 1,800,615. However, the application herein differs from that disclosed in the reference. The mechanism for operating the brakes on the front wheels consists of a pair of brake operating rods 41 which are reciprocally mounted within the front radius rods 25, the forward ends of these rods being shaped into sockets into which ball ended levers 42 are secured. Each lever 42 is affixed to one end of a brake operating shaft 43, which shaft is rotatably mounted in a housing which extends laterally from each radius rod. It will be noted that the outer end of each housing 44 is provided with an integral pin 45 which projects up into a suitable opening in the lower pin 33 to thereby align the housing 44 with the pivotal axis of the wheel. A cam 46 is provided on the outer end of each shaft 43 which reciprocates a wedge 47, this wedge expanding the brake shoes into engagement with the drum 39. Due to the accurate method of securing the end of the housing 44 to the king pin a rigid non-chattering brake results.

Referring to Figure 5, it will be noted that the wheels which are used in my vehicle are mounted directly upon the brake drums 39. Five bolts 61 are anchored in the periphery of each brake drum and a conical-shaped washer 62 is secured upon each bolt. Wheel rims 63 are provided, these rims being of the drop center type, each having an inwardly extending disc 64 welded thereto. Five openings are provided in each disc 64, one for each of the bolts 61, with the metal of the disc adjacent to these openings being deformed so as to extend down into the conical-shaped washers 62. Nuts 65 are threaded upon each bolt 61, these nuts having conical-shaped coacting faces so that the metal of the disc 64 is clamped between the washers 62 and the nuts 65. It will be noted that the material of the washers 62 is considerably thicker than the discs 64. The discs may be made of thinner material than has heretofore been customary because the gripping action of the nuts 65 does not tend to distort the material of the discs. A hub cap 70 is fixedly secured to the center of each disc 64 to thereby complete the wheel assembly.

In order to transmit the drive from the motor to the front wheels shafts 66 are provided in the axle 24, and one-half of a universal joint 67 is secured to the outer end of each shaft within the spherical members 32 and 35. The other half of each joint extends outwardly through the spindles 36 where they are splined to sleeve 68, these sleeves having radially extending flanges 69 formed thereon by means of which the sleeves are secured to the hubs 38. Rotation of the shafts 66 thereby rotates the wheels through the universal joints 67.

The rear wheels of my vehicle are of the same general description as the just described front wheels but differ therefrom in that no drive is provided. Similarly, the brakes which are provided for the rear wheels of the vehicle are identical to the brakes shown in Figure 5, with the exception that conventional king pins are employed in place of the pins 33 so that the housings 44 are fastened to the lower end of these king pins. In each case the brake operating rods extend diagonally through the radius rods, the longitudinal movement of which applies the brakes.

Referring to Figure 7, the two brake operating rods which extend through the radius rods 15 have their forward ends joined to be thereby simultaneously operated by an arm 48 which is housed within the adjacent ends of the radius rods. A tension rod 49 is connected to the free end of the arm 48 and extends axially out through the center of the ball joint 16 so that forward movement of the rod 49 simultaneously applies both of the rear wheel brakes.

The rearmost ends of each of the rods 41 are joined together and to an arm 50 which is housed within a suitable housing formed by the rearmost ends of the radius rods 25 and the torque tube 23. The arm 50 is secured on a shaft 51, this shaft extending out through the side of the radius rod. An operating lever 52 is secured thereto. The free end of the lever 52 is fastened to a rod 53, which extends forwardly where it is secured to a brake pedal 54. Consequently, the application of the pedal 54 moves the lever 52 to thereby draw the rods 41 rearwardly thereby applying both front wheel brakes of the vehicle.

Referring to Figure 8, it will be noted that a second lever 55 is pivotally secured in position adjacent to the lever 52 and that a pair of coacting ears 56 are formed on the adjacent ends of these levers which coact with each other substantially as a pair of gear teeth so that when the lever 52 is moved clockwise the lever 55 will be moved in a counterclockwise direction through the same angular degree. The lower end of the lever 55 is secured directly to the tension rod 49 so that upon application of the front wheel brakes the rear brakes will simultaneously be applied.

From Figure 1 it will be seen that an auxiliary rod 57 extends from a suitable lever which is secured to the shaft 51, this rod 57 extending forwardly where it is secured to an emergency brake lever 58 whereupon application of either the foot pedal 54 or the brake lever 58 will apply the brakes on all four wheels of the vehicles.

Figure 9 illustrates a simple and very effective means for securing the brake rods 49, 53 and 57 to their respective operating levers. The free ends of each of the levers are threaded as at 59, while a tapped eye 60 is formed in the ends of the rods. To assemble each rod to its lever, the lever is simply screwed into the eye and then the opposite ends of the lever is fastened to its operating shaft. When the brakes are applied the eye moves longitudinally on the threaded end 59 but the movement is so slight as to be almost negligible and is no detriment to the action of the device. The important feature of this type of connection is that the brake rods cannot become loose nor can they be assembled in a manner that would possibly allow them to become loosened. The ordinary type connection depends upon cotter keys or similar fastenings which may or may not be installed correctly, whereas with this connection it is impossible to install the device in any way in which the rod could accidentally become detached from the lever.

Among the many advantages arising from the use of my improved device, it may be well to mention that the motor used herein is placed directly over the rear axle which is of the drop center type so that the center of gravity of the motor is very low. This motor location further permits a streamlined body to be used in which the passenger compartment is provided intermediate of the axles without necessitating an excessively long body.

A further advantage results in that my improved brake system is almost fully enclosed.

Still a further advantage results in that due to the four-wheel steering employed wherein the front wheels swing through a 50 per cent greater range than the rear wheels very efficient operation of the wheel universal joints is assured while still maintaining a small turning radius and while eliminating the inherent defects in the four-wheel steered type of vehicle.

Some changes may be made in the arrangement, construction and combination of the various parts comprising my improved device without departing from the spirit of my invention, and it is my intention to cover by my claim such changes as may reasonably be included within the scope thereof.

I claim as my invention:

A mechanism for operating the brakes of a steerable vehicle wheel comprising, a vertical king-pin around which said wheel oscillates, a detachable housing which extends from position beneath said pin inwardly toward the center of the vehicle, the inner end of said housing being supported upon the axle of said vehicle, and the outer end of said housing being provided with a vertical pin which is formed integrally therewith and which extends upwardly into an axial bore in said king-pin so as to support said housing, and a shaft rotatably mounted within said housing, said shaft having an operating cam disposed on its end which is adjacent to said king-pin, which cam coacts with the brakes associated with said wheel to engage same upon rotation of said shaft.

HENRY FORD.